United States Patent
Liang et al.

(10) Patent No.: US 9,695,352 B2
(45) Date of Patent: Jul. 4, 2017

(54) COMPOSITIONS FOR TREATING SUBTERRANEAN FORMATIONS

(71) Applicant: Halliburton Energy Services, Inc., Houston, TX (US)

(72) Inventors: Feng Liang, Cypress, TX (US); Baireddy Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/439,364

(22) PCT Filed: Dec. 16, 2013

(86) PCT No.: PCT/US2013/075440
§ 371 (c)(1),
(2) Date: Apr. 29, 2015

(87) PCT Pub. No.: WO2015/094165
PCT Pub. Date: Jun. 25, 2015

(65) Prior Publication Data
US 2016/0040055 A1    Feb. 11, 2016

(51) Int. Cl.
*E21B 43/16* (2006.01)
*C09K 8/80* (2006.01)
(Continued)

(52) U.S. Cl.
CPC ............ *C09K 8/52* (2013.01); *C09K 8/035* (2013.01); *C09K 8/50* (2013.01); *C09K 8/5083* (2013.01); *C09K 8/62* (2013.01); *C09K 8/68* (2013.01); *C09K 8/725* (2013.01); *C09K 8/74* (2013.01); *C09K 8/80* (2013.01); *C09K 8/805* (2013.01); *C09K 8/86* (2013.01); *C09K 8/882* (2013.01); *E21B 43/16* (2013.01); *C09K 2208/02* (2013.01)

(58) Field of Classification Search
CPC ...... C09K 8/5083; C09K 8/5753; C09K 8/68; C09K 8/882; C09K 8/52; C09K 8/588
See application file for complete search history.

(56) References Cited

U.S. PATENT DOCUMENTS

| | | |
|---|---|---|
| 4,455,240 A | 6/1984 | Costello |
| 4,487,867 A | 12/1984 | Almond et al. |

(Continued)

FOREIGN PATENT DOCUMENTS

| | | |
|---|---|---|
| WO | WO-2005003515 A1 | 1/2005 |
| WO | WO-2005071220 A1 | 8/2005 |
| WO | WO-2015094165 A1 | 6/2015 |

OTHER PUBLICATIONS

Eoff, Larry "Improvements to Hydrophobically Modified Water-Soluble Polymer Technology to Extend the Range of Oilfield Applications" SPE 140848 pp. 1-12 2012.*

(Continued)

*Primary Examiner* — Doug Hutton, Jr.
*Assistant Examiner* — Charles Nold
(74) *Attorney, Agent, or Firm* — Chamberlain Hrdlicka

(57) ABSTRACT

A method comprises obtaining or providing a treatment fluid comprising compounds comprising a structure of the formula (I) or (Ia) or compounds of the formula (Ib) and placing the treatment fluid in a subterranean formation.

14 Claims, 1 Drawing Sheet

(51) Int. Cl.
*C09K 8/52* (2006.01)
*C09K 8/035* (2006.01)
*C09K 8/68* (2006.01)
*C09K 8/74* (2006.01)
*C09K 8/86* (2006.01)
*C09K 8/50* (2006.01)
*C09K 8/508* (2006.01)
*C09K 8/62* (2006.01)
*C09K 8/72* (2006.01)
*C09K 8/88* (2006.01)

(56) References Cited

U.S. PATENT DOCUMENTS

| | | | |
|---|---|---|---|
| 4,617,132 A | 10/1986 | Dalrymple et al. | |
| 4,674,574 A * | 6/1987 | Savoly | C04B 24/16 106/719 |
| 4,708,205 A | 11/1987 | Tackett | |
| 5,208,216 A | 5/1993 | Williamson et al. | |
| 5,775,425 A | 7/1998 | Weaver et al. | |
| 6,047,772 A | 4/2000 | Weaver et al. | |
| 7,392,847 B2 | 7/2008 | Gatlin et al. | |
| 7,651,980 B2 * | 1/2010 | Jarrett | C09K 8/12 507/120 |
| 8,413,719 B2 * | 4/2013 | Milne | C09K 8/5083 166/279 |
| 2006/0234871 A1 * | 10/2006 | Dalrymple | C09K 8/428 507/211 |
| 2008/0200583 A1 | 8/2008 | Herth et al. | |
| 2008/0214413 A1 | 9/2008 | Ewanek | |
| 2009/0260820 A1 * | 10/2009 | Kurian | C09K 8/5083 166/292 |
| 2013/0005616 A1 * | 1/2013 | Gaillard | C09K 8/588 507/225 |

OTHER PUBLICATIONS

Eoff, Larry et al. "Development of a hydrophobically Modified Water Soluble Polymer as a Selective Bullhead System for Water-Production Problems" SPE 80206 pp. 1-9 2003.*

"International Application Serial No. PCT/US2013/075440, International Search Report mailed Sep. 26, 2014", 3 pgs.

"International Application Serial No. PCT/US2013/075440, Written Opinion mailed Sep. 26, 2014", 5 pgs.

"International Application Serial No. PCT/US2013/075440, International Preliminary Report on Patentability mailed Jun. 30, 2016", 7 pgs.

* cited by examiner

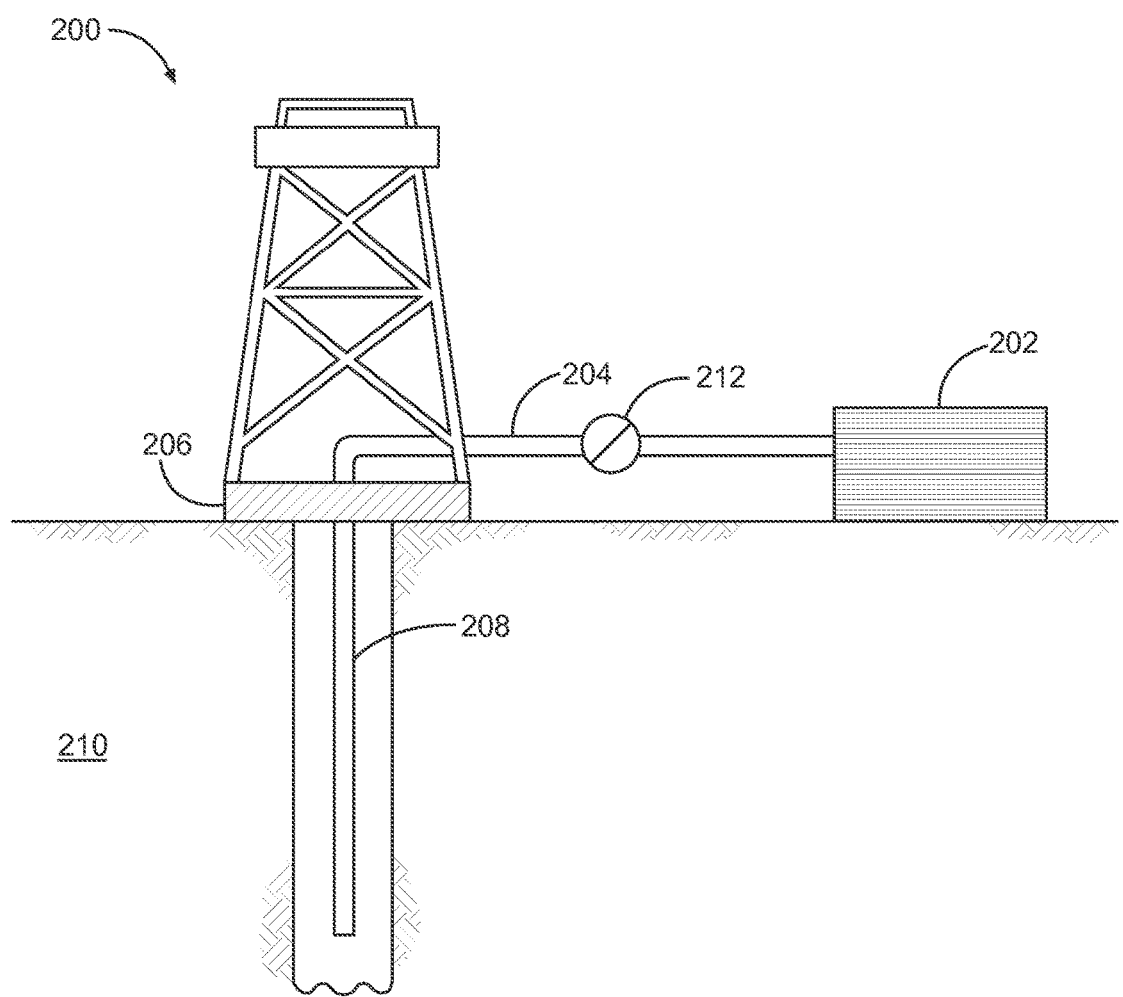

COMPOSITIONS FOR TREATING SUBTERRANEAN FORMATIONS

PRIORITY APPLICATIONS

This application is a U.S. National Stage Filing under 35 U.S.C. §371 from International Application No. PCT/US2013/075440, filed on 16 Dec. 2013, which application is incorporated by reference herein in its entirety.

BACKGROUND OF THE INVENTION

The production of water with hydrocarbons, e.g., oil and/or gas, from wells constitutes a major problem and expense in the production of hydrocarbons from subterranean formations. In addition to problems related to dealing with produced water such as separation, transportation and disposal, the associated problems which arise as a result of water flow into the wellbore include increased sand production, fines production, damage to formation permeability due to fines migration. Chemical compositions have been utilized to decrease the amount of produced water. When water and oil producing are not inadequately isolated from each other, chemical compositions sometimes contain polymeric materials referred to as relative permeability modifiers ("RPMs"), sometimes referred to as disproportionate permeability reducers or selective plugging systems are injected into the formation. An RPM polymer, such as polyacrylamide or water soluble polyacrylate with suitable pendant branches, is dissolved in water and pumped into a subterranean formation that produces water and hydrocarbon. The polymer reduces the permeability of water through the formation without substantially affecting the permeability of hydrocarbon. However, such polymer treatments may not prevent or reduce fines migration or sand production. Additionally, in enhanced oil recovery operations (EOR), frequently water is injected into the injection well to sweep oil towards a produced well. When high permeability channels or zones exist that connect an injection well with the producer well, much of the water typically injected at high rates finds its way to produced wells by bypassing the oil producing zones. Such high permeability channels also enhance fines migration causing near wellbore permeability in the vicinity of the producer well. Thus, there is a need for treatments which can minimize fines migration and production and at the same allow for water permeability modification.

SUMMARY OF THE INVENTION

Various embodiments of the present invention are directed to polymeric compounds that are suitable for dual water-control and fines-control functions.

In various embodiments, the invention relates to a method comprising:
obtaining or providing a treatment fluid comprising:
a compound comprising a structure of the formula (I):

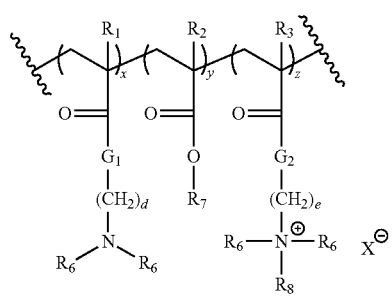

(I)

wherein each $X^-$ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84; and
placing the treatment fluid in a subterranean formation.

In various other embodiments, the invention relates to a method comprising:
placing a treatment fluid comprising:
a compound comprising a structure of the formula (I):

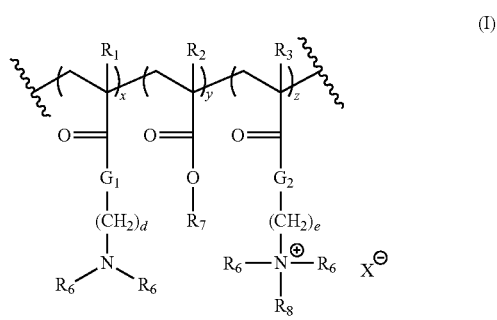

(I)

wherein each $X^-$ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
in a subterranean formation.

In various other embodiments, the invention relates to a treatment fluid comprising:
a compound comprising a structure of the formula (I):

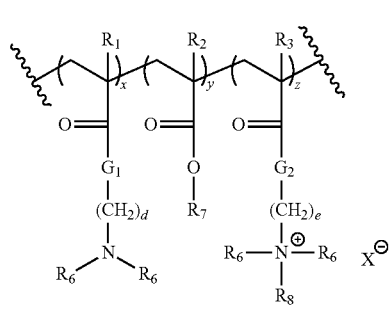

(I)

wherein each $X^-$ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR$_7$ is a —C(O)OM group, wherein M is a cationic counterion;
each $R_8$ is, independently, a hydrocarbyl group;
each $G_1$ is, independently, —O— or —NR$_4$—, wherein each $R_4$ is independently H or a hydrocarbyl group;
each $G_2$ is, independently, —O— or —NR$_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84.

In still other embodiments, the invention relates to a plurality of proppant particles comprising a compound comprising a structure of the formula (I):

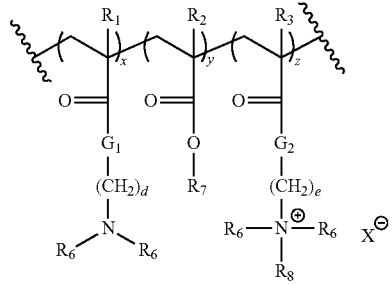

(I)

wherein each $X^-$ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR$_7$ is a —C(O)OM group, wherein M is a cationic counterion;
each $R_8$ is, independently, a hydrocarbyl group;
each $G_1$ is, independently, —O— or —NR$_4$—, wherein each $R_4$ is independently H or a hydrocarbyl group;
each $G_2$ is, independently, —O— or —NR$_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84.

In various other embodiments, the invention relates to a method comprising:
(i) metering a composition comprising a compound comprising a structure of the formula (I):

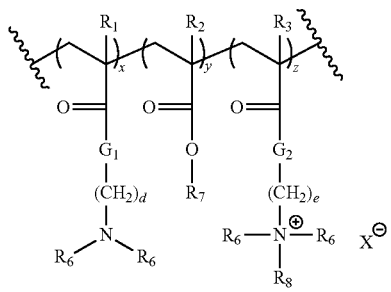

(I)

wherein each $X^-$ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR$_7$ is a —C(O)OM group, wherein M is a cationic counterion;
each $R_8$ is, independently, a hydrocarbyl group;
each $G_1$ is, independently, —O— or —NR$_4$—, wherein each $R_4$ is independently H or a hydrocarbyl group;
each $G_2$ is, independently, —O— or —NR$_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
into an aqueous base fluid comprising a plurality of proppant particles, while the aqueous base fluid is being mixed, to make a proppant-containing mixture;
(ii) mixing the proppant-containing mixture for a time sufficient for the composition comprising a compound comprising a structure of the formula (I) to coat the proppant particles to make a proppant slurry in the aqueous base fluid; and
(iii) placing the proppant slurry in the aqueous base fluid in a subterranean formation as part of a hydraulic fracturing, frac-packing, or gravel treatment.

In various other embodiments, the invention relates to a method comprising:
(i) dry-coating a plurality of proppant particles with a composition comprising a compound comprising a structure of the formula (I):

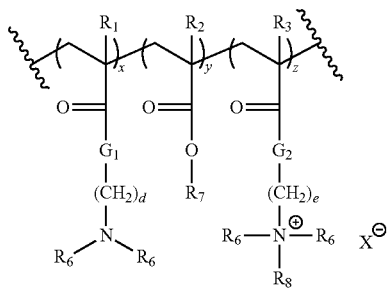

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
to make a plurality of dry-coated proppant particles;
(ii) mixing the plurality of dry-coated proppant particles with an aqueous base fluid to make a proppant slurry; and
(iii) placing the proppant slurry in the aqueous base fluid in a subterranean formation as part of a hydraulic fracturing, frac-packing or gravel treatment.

In various other embodiments, the invention relates to a method of treating a subterranean formation sand matrix comprising:
(i) diluting a composition comprising a compound comprising a structure of the formula (I):

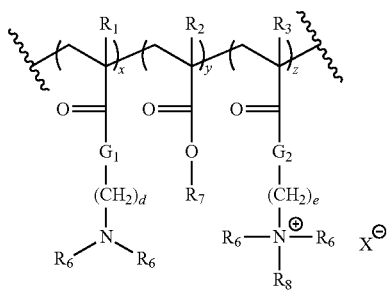

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
with an aqueous base fluid to make a treatment fluid; and
(ii) placing the treatment fluid in a near wellbore region or propped fracture, thereby treating the formation sand matrix.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 is a well treatment assembly in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

As used herein, the term "treatment fluids" refers generally to any fluid that may be used in a subterranean application in conjunction with a desired function and/or for a desired purpose. The term "treatment fluid" does not imply any particular action by the fluid or any component thereof. As a result, the present compositions can be inexpensive and simple to prepare, using either batch mixing or on-the-fly procedures. In some embodiments, the term "treatment fluids" includes, but is not limited to stimulation fluids, clean-up fluids, fracturing fluids, spotting fluids, production fluids, completion fluids, remedial treatment fluids, acidizing fluids, fluid control materials (e.g., water control materials), packing fluids or combinations thereof.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation or fines that may have migrated during the life of the well. In some examples, an acidizing fluid can be used for damage removal.

As used herein, the term "fluid control material" (e.g., a "water control material" or a "conformance treatment material") refers to a solid or liquid material that, by virtue of its viscosification in the flowpaths producing a fluid (e.g., water) alters, reduces or blocks the flow rates of such fluids into the wellbore, such that hydrophobic material can more easily travel to the surface and such that hydrophilic material (including water) can less easily travel to the surface. For example, a fluid control material can be used to treat a well to cause a proportion of a fluid produced, which may include water, to decrease and to cause the proportion of hydrocarbons produced to increase, such as by selectively causing the material to form a viscous plug between water-producing subterranean formations and the wellbore, while still allowing hydrocarbon-producing formations to maintain output.

In some embodiments, the fluid control material mitigates (e.g., reduces, stops or diverts) the flow of fluids (e.g., treatment fluids) through a portion of a subterranean formation that is penetrated by the well such that the flow of the fluid into high-permeability portions of the formation is mitigated. For example, in an injection well, it may be desirable to seal off high-permeability portions of a subterranean formation that would otherwise accept most of an injected treatment fluid. By sealing off the high-permeability portions of the subterranean formation, the injected treatment fluid may thus penetrate less permeable portions of the subterranean formation. In other embodiments, the fluid control material helps mitigate the production of undesired fluids (e.g., water) from a well by at least sealing off one or more permeable portions of a treated subterranean formation.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

In some embodiments, the treatment fluids of the present invention lock (or stabilize) fines in place in a subterranean formation, while simultaneously reducing the fluid permeability of the subterranean formation. This locking or stabilization immobilize the fines, and is often referred to as "fines control."

As used herein, the term "fines" includes materials that may be produced during, e.g., drilling and fracturing processes. The fines may be produced in a subterranean formation by, among other process, proppant crushing, spalling of the face of created fractures and/or scouring of a subterranean formation's wall. The fines may range from 200 to about 600 mesh on the U.S. Sieve Series.

Embodiments of the present invention are generally directed to methods comprising obtaining or providing a treatment fluid and placing (e.g., injecting, pumping, flowing or combinations thereof) the treatment fluid in a subterranean formation. The treatment fluid of the embodiments of the present invention may be used for any treatment or subterranean operation known to one of ordinary skill in the art.

The obtaining or providing of the treatment fluid can occur at any suitable time and at any suitable location. For example, the obtaining or providing of the treatment fluid can occur above the surface. The obtaining or providing of the treatment fluid can also occur downhole. The placing of the treatment fluid in the subterranean formation can include contacting the treatment fluid and any suitable part of the subterranean formation. The subterranean formation can be any suitable subterranean formation. In some examples, the placing of the treatment fluid in the subterranean formation includes contacting the treatment fluid with or placing the treatment fluid in at least one of a fracture, at least a part of an area surrounding a fracture, a flow pathway, an area surrounding a flow pathway, and an area desired to be fractured. The placing of the treatment fluid in the subterranean formation can be any suitable placing and can include any suitable contacting between the subterranean formation and the treatment fluid. The placing of the treatment fluid in the subterranean formation can include at least partially depositing the treatment fluid in a fracture, flow pathway, or area surrounding the same.

The method can be a method of hydraulic fracturing, such as a method of hydraulic fracturing to generate a fracture or flow pathway. The treatment fluid can include a fracturing fluid; the treatment fluid can be a fracturing fluid. The fracturing fluid can be an aqueous fracturing fluid, having a continuous phase that is aqueous. The treatment fluid can further include a proppant, a resin-coated proppant, or a combination thereof. Obtaining or providing the treatment fluid can include obtaining or providing a fracturing fluid and combining the compounds described herein with the fracturing fluid, to provide the treatment fluid. Placing the treatment fluid in the subterranean formation can include pumping the treatment fluid into the subterranean formation.

The placing of the treatment fluid in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of the treatment fluid only with no proppant, such as to begin to break into an area and initiate fractures to produce sufficient penetration and width to allow proppant-laden later stages to enter), or a slurry stage of the fracturing (e.g., treatment fluid with proppant). The method can include performing a stimulation treatment at least one of before, during, and after placing the treatment fluid in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the treatment fluid is placed or contacted, or the treatment fluid is placed or contacted to an area surrounding the generated fracture or flow pathway.

In some embodiments, the treatment fluids of the present invention comprise, among other things, a compound comprising a structure of the formula (I):

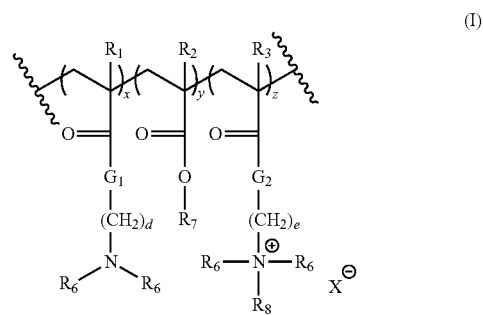

wherein each $X^-$ is a counterion (e.g., $Cl^-$, $Br^-$, and the like);
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR$_7$ is a —C(O)OM group, wherein M is a cationic counterion;
each $R_8$ is, independently, a hydrocarbyl group;
each $G_1$ is, independently, —O— or —NR$_4$—, wherein each $R_4$ is independently H or a hydrocarbyl group;
each $G_2$ is, independently, —O— or —NR$_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84.

In other embodiments, the treatment fluids of the present invention comprise, among other things, a compound comprising a structure of the formula (Ia):

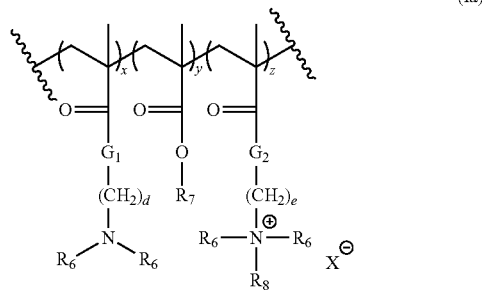

(Ia)

wherein X, $R_6$, $R_7$, $R_8$, $G_1$, $G_2$, d, e, x, y, and z are as defined above.

In other embodiments, the treatment fluids of the present invention comprise, among other things, a compound of the formula (Ib):

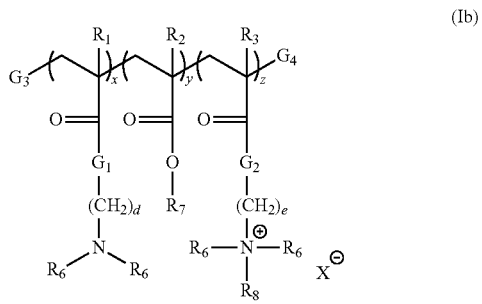

(Ib)

wherein X, $R_6$, $R_7$, $R_8$, $G_1$, $G_2$, d, e, x, y, z, $R_1$, $R_2$, and $R_3$ as defined above; and $G_3$ and $G_4$ are each, independently, a suitable end-capping group such as —H, —OH, $C_1$-$C_8$ hydrocarbyl, and the like. In some embodiments, in the compounds of the formula (Ib), $R_1$, $R_2$, and $R_3$ are each $CH_3$.

As used herein, the term "cationic counterion" (e.g., the cationic counterion M in the group —C(O)OM) refers to any suitable cationic counterion including, but not limited to, $^+N(R_{10})_4$ (ammonium), wherein each $R_{10}$ is, independently, H or a $C_1$-$C_8$ alkyl group; an alkali metal ion, including, but not limited to, lithium, sodium, potassium, and the like; an alkaline earth metal ion, including, but not limited to magnesium, calcium, and strontium; and the like.

In some embodiments, each $R_6$ is, independently, a $C_1$-$C_8$ hydrocarbyl group (e.g., a $C_1$-$C_8$ alkyl group). In other embodiments, $R_7$ is absent such that the group is a —C(O)O$^-$. In still other embodiments, each $R_8$ is, independently, a $C_8$-$C_{30}$ hydrocarbyl group (e.g., a $C_8$-$C_{30}$ alkyl group) or a $C_{12}$-$C_{20}$ hydrocarbyl group (e.g., a $C_{12}$-$C_{20}$ alkyl group). In yet other embodiments, each $G_1$ or $G_2$ is, independently, —O—.

In some embodiments, each $G_1$ and $G_2$ is —O—; $R_7$ is absent such that the group is a —C(O)O$^-$; each d and e is 2; each $R_6$ is a methyl group; and each $R_8$ is a $C_{12}$-$C_{20}$ alkyl group.

In some embodiments z, in the compounds comprising a structure of the formula (I) or (Ia) or in the compounds of the formula (Ib), is between about 0.2 to about 0.5; about 0.25 to about 0.5; or about 0.3 to about 0.5.

In some embodiments, x+y, in the compounds comprising a structure of the formula (I) or (Ia) or in the compounds of the formula (Ib), is between about 0.5 to about 0.8; about 0.5 to about 0.75; or about 0.5 to about 0.7. In some embodiments, x and/or y may be zero. In other embodiments, x is greater than 0 and y is also greater than 0.

In some embodiments, in the compounds comprising a structure of the formula (Ia), the molar ratio of the sum of the moles of $CH_3$ groups along the backbone of the polymer to moles of groups —C(O)-$G_2$-$(CH_2)_e$—N$(R_6)_2R_8^+$ is 0.1:1 to 1:0.1.

Those of ordinary skill in the art will also recognize that compounds comprising a structure of the formula (I) or (Ia) or compounds of the formula (Ib) contain chiral centers. For example, the carbon atoms directly bonded to the $CH_3$ groups along the backbone of the polymer in compounds comprising a structure of the formula (Ia) are chiral. All diastereomers of the compounds comprising a structure of the formula (I) or (Ia) or of the compounds of the formula (Ib) are contemplated herein.

As used herein, the term "hydrocarbyl" broadly refers to a straight chain, branched, or cyclic hydrocarbon, and can be alkyl, alkenyl, alkynyl, aryl, cycloalkyl, acyl, or any combination thereof.

As used herein, the term "alkyl" broadly refers to straight chain and branched alkyl groups having from 1 to 40 carbon atoms, 1 to about 30 carbon atoms, 1 to 12 carbons or, in some embodiments, from 8 to 30 carbon atoms, 12 to 20 carbon atoms, 16 to 30 carbon atoms, 1 to 8 carbon atoms or 1 to 4 carbon atoms. Such alkyl groups may be substituted or unsubstituted. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. The term "alkyl" also encompasses groups including —$(CH_2)_n$— groups.

As used herein, the term "alkenyl" broadly refers to straight and branched chain alkyl groups as defined herein, except that at least one double bond exists between two carbon atoms. Such alkenyl groups may be substituted or unsubstituted. Thus, alkenyl groups have from 2 to 40 carbon atoms, or 2 to about 30 carbon atoms, or 2 to 12 carbons or, in some embodiments, from 2 to 8 carbon atoms. Examples include, but are not limited to vinyl, —CH=CH$(CH_3)$, —CH=C$(CH_3)_2$, —C$(CH_3)$=$CH_2$, —C$(CH_3)$=CH$(CH_3)$, —C$(CH_2CH_3)$=$CH_2$, cyclohexenyl, cyclopentenyl, cyclohexadienyl, butadienyl, pentadienyl, hexadienyl, and the like.

As used herein, the term "alkynyl" broadly refers to straight and branched chain alkyl groups as defined herein, except that at least one triple bond exists between two carbon atoms. Such alkynyl groups may be substituted or unsubstituted. Thus, alkynyl groups have from 2 to 40 carbon atoms, or 2 to about 30 carbon atoms, or 2 to 12 carbons or, in some embodiments, from 2 to 8 carbon atoms. Examples include, but are not limited to —C≡CH, —C≡CCH$_3$, —CH$_2$CH$_2$C≡CH, —CH$_2$CH$_2$C≡CCH$_2$CH$_2$—, and the like.

As used herein, the term "aryl" broadly refers to cyclic aromatic hydrocarbons that do not contain heteroatoms in the ring. Such aryl groups may be substituted or unsubstituted. Aryl groups include, but are not limited to, phenyl, azulenyl, heptalenyl, biphenyl, indacenyl, fluorenyl, phenanthrenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative, non-limiting substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

As used herein, the term "cycloalkyl" broadly refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Such cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The cycloalkyl group may have one more unsaturated bonds.

As used herein, the term "substituted" broadly refers to a group (e.g., an aryl group, a heterocycyl group, an alkyl group, an alkenyl group, a cycloalkyl) in which one or more hydrogen atoms contained therein are replaced by one or more "functional groups" or "substituents." Examples of substituents or functional groups include, but are not limited to, halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylate salts, and carboxylate esters; a sulfur atom in groups such as thiol groups, alkyl and aryl sulfide groups, sulfoxide groups, sulfone groups, sulfonyl groups, and sulfonamide groups, sulfonate salts and sulfate salts; a nitrogen atom in groups such as amines, hydroxylamines, nitriles, nitro groups, N-oxides, hydrazides, azides, and enamines; and other heteroatoms in various other groups. Non-limiting examples of substituents include F, Cl, Br, I, OR, OC(O)N(R')$_2$, CN, NO, NO$_2$, ONO$_2$, azido, CF$_3$, OCF$_3$, R', =O (oxo), =S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or wherein two R groups bonded to a nitrogen atom or to adjacent nitrogen atoms can together with the nitrogen atom or atoms form a heterocyclyl. In an embodiment, the substituents are polar or ionic.

As used herein, the term "acyl" broadly refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. Where the carbonyl carbon atom is bonded to a hydrogen, the group is a "formyl" group. Where the carbonyl carbon atom is bonded to a halogen atom, the group is a "haloacyl" group. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms (e.g., nitrogen and oxygen). A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like.

As used herein, the terms "halo" or "halogen" or "halide," by themselves or as part of another substituent, mean, unless otherwise stated, a fluorine, chlorine, bromine, or iodine atom, preferably, fluorine, chlorine, or bromine.

As used herein, the term "amino group" broadly refers to a substituent of the form —NH$_2$, —NHR$_{10}$, —N(R$_{10}$)$_2$, —N(R$_{10}$)$_3^+$, wherein each R$_{10}$ is independently selected and may be a C$_1$-C$_8$ alkyl group, and protonated forms of each, except for —N(R$_{10}$)$_3^+$, which cannot be protonated; or to the group —N(R$_{10}$)— and protonated forms thereof. Accordingly, any compound substituted with an amino group can be viewed as an amine. An "amino group" within the meaning herein can be a primary, secondary, tertiary or quaternary amino group, preferably a primary or a secondary amino group.

Compounds comprising a structure of the formula (I) or (Ia) or compounds of the formula (Ib) may be synthesized using methods known in the art, including the methods described in Published PCT Appl. No. WO2005/003515, the entire disclosure of which is incorporated by reference as if fully set forth herein.

In an embodiment, the treatment fluid is used as a fracturing fluid. In other embodiments, the compositions and methods of the present invention may be useful to alter, block, and/or control the flow of fluids into, through or out of (e.g., reduce the permeability) subterranean formations. In still other embodiments, the compositions and methods of the present invention may be useful to alter, block, and/or control the flow or migration of fines into, through or out of subterranean formations. In yet other embodiments, the compositions and methods of the present invention may be useful to alter, block, and/or control the flow of fluids into, through or out of subterranean formations and, substantially simultaneously, the flow or migration of fines into, through or out of subterranean formations.

The aqueous base fluid used in the treatment fluids of the embodiments of the present invention comprises one or more aqueous fluids. For example, the aqueous base fluid may include, but is not limited to, seawater, produced water, flowback water, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the embodiments of the present invention. In certain embodiments, the density of the aqueous base fluid can be increased, among other purposes, to provide additional particle transport and suspension in the treatment fluids of the embodiments of the present invention. When the solubility of the compounds comprising a structure of the formula (I) or (Ia) or of the compounds of the formula (Ib) in water is less than 5% by weight, water-miscible solvents such alcohols (e.g., isopropanol), alcohol ethers (e.g., ethylene glycol methyl ether, ethyeleneglycol butyl ether or combinations thereof) or ketones (e.g., acetone, methyl ethyl ketone or combinations thereof) may be added to the aqueous base fluid. Alternatively, water dispersions of the compounds comprising a structure of the formula (I) or (Ia) or of the compounds of the formula (Ib) may be used as treatment fluids.

In some embodiments, the treatment fluid including compounds comprising a structure of the formula (I) or (Ia) or compounds of the formula (Ib) can include any suitable amount of any suitable material used in a downhole fluid. For example, the treatment fluid can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, rheology modifier, oil-wetting agents, surfactants, corrosion inhibitors, gases, lost circulation materials, filtration control additives, salts, fibers, thixotropic additives, crosslinkers, rheology modifiers, pH modifiers, chelating agents, scale inhibitors, enzymes, resins, water control materials, markers, or a combination thereof.

In certain embodiments, the pH of the aqueous base fluid may be adjusted (e.g., by a buffer or other pH adjusting agent) prior to the preparation of the treatment fluids to, among other things, reduce the viscosity of the treatment fluid. In general, the pH of the aqueous base fluid may be about 11 or less (e.g., from about 4.0 to about 8, from about 5.0 to about 9.5, from about 5.5 to about 9, from about 6 to about 10, from about 5 to about 10 or from about 7 to about 8). Suitable pH adjusting agents include any compounds capable of altering the pH of the treatment fluid. Examples of such compounds that may be used include, but are not limited to, formic acid, fumaric acid, acetic acid, acetic anhydride, sodium acetate, sodium diacetate, monosodium-, disodium- or trisodium salts of citric acid, potassium tartarates, borate salts, hydrochloric acid, sodium hydroxide, potassium hydroxide, lithium hydroxide, various carbonates, bicarbonates, phosphates, hydrogen phosphates, dihydrogen phosphates any combination thereof, or any other commonly used pH control agent that does not adversely affect the compounds comprising a structure of the formula (I) or (Ia) or the compounds of the formula (Ib) to prevent their use in accordance with the method of the present invention. When used, the pH-adjusting compound is generally present in a treatment concentrate of the present invention in an amount in the range of from about 0.5% to about 10% by weight of the aqueous fluid therein. In another embodiment, the pH-adjusting compound is generally present in a treatment fluid of the present invention in an amount in the range of from about 0.01% to about 0.3% by weight of the aqueous fluid therein. One of ordinary skill in the art, with the benefit of this disclosure, will recognize if/when such density and/or pH adjustments are appropriate.

The compounds comprising a structure of the formula (I) or (Ia) or the compounds of the formula (Ib) may be present in the treatment fluid in an amount in the range of from about 0.1 percent to about 15 percent by weight of the treatment fluid, e.g., from about 0.5 percent to about 5 percent by weight or from about 1 percent to about 3 percent by weight of the treatment fluid.

In some embodiments, the treatment fluids of the present invention may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh or smaller on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. Also, mixtures of particulates may be used having different particle size distribution ranges to enhance the packed volume of the proppant particulates within the fracture. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with compounds comprising a structure of the formula (I) or (Ia) or compounds of the formula (Ib), by themselves, or in combination with any suitable resin or tackifying agent known to those of ordinary skill in the art. Alternatively, the particulates may be treated with any suitable resin or tackifying agent, compounds comprising a structure of the formula (I) or (Ia) or compounds of the formula (Ib) added to the treatment fluid containing surface treated particulates. In certain embodiments, the particulates may be present in the treatment fluids of the present invention in an amount in the range of from about 0.5 pounds per gallon ("ppg") to about 30 ppg by volume of the treatment fluid. In certain other embodiments, the proppant is about 1 wt % to about 90 wt % of the treatment fluide, e.g., about 5 wt % to about 70 wt % of the treatment fluid.

Some embodiments of the present invention relate to a plurality of proppant particles comprising a composition comprising compounds comprising a structure of the formula (I) or (Ia) or compounds of the formula (Ib) adsorbed thereon. In some embodiments, the composition comprising compounds comprising a structure of the formula (I) or (Ia) or compounds of the formula (Ib) substantially cover each particle of the plurality of proppant particles or completely covers each particle of the plurality of proppant particles. In some embodiments, the proppant particles are treated (e.g., contacted in a fluidized bed or melt-coated) with compounds comprising a structure of the formula (I) or (Ia) or compounds of the formula (Ib) in a dry state or as a solution in a non-aqueous solvent prior to the addition of treated proppant particles to the treatment fluid; that is, compounds comprising a structure of the formula (I) or (Ia) or compounds of the formula (Ib) may be provided as a dry powder. The dry powder may comprise other components known in the art that may facilitate the adhesion of the dry powder to a plurality of proppant particles.

The treatment fluids of the embodiments of the present invention can be prepared by dissolving or suspending one or more of the components (e.g., compounds comprising a structure of the formula (I) or (Ia) or compounds of the formula (Ib)) in an aqueous base fluid (e.g., fresh water and/or seawater); combining one or more of the components in solid form, then adding an aqueous base fluid; or dissolving one or more of the components in water or water-miscible solvent and adding, to the solution, one or more of the components in solid form. Additional components may be added into the treatment fluid.

In various embodiments, the present invention provides a method comprising metering a composition comprising compounds comprising a structure of the formula (I) or (Ia) or compounds of the formula (Ib) into an aqueous base fluid comprising a plurality of proppant particles, while the aqueous base fluid is being mixed, to make a proppant-containing mixture; mixing the proppant-containing mixture for a time sufficient for the composition comprising compounds comprising a structure of the formula (I) or (Ia) or compounds of the formula (Ib) to coat the proppant particles to make a proppant slurry in the aqueous base fluid; and placing the proppant slurry in the aqueous base fluid in a subterranean formation as part of a hydraulic fracturing, frac-packing or gravel treatment.

In various embodiments, the present invention provides a method comprising dry-coating a plurality of proppant particles with a composition comprising compounds comprising a structure of the formula (I) or (Ia) or compounds of the formula (Ib); mixing the plurality of dry-coated proppant particles with an aqueous base fluid to make a proppant slurry; and placing the proppant slurry in the aqueous base fluid in a subterranean formation as part of a hydraulic fracturing, frac-packing or gravel treatment.

In various embodiments, the present invention provides a method of treating a subterranean formation sand matrix comprising diluting a composition comprising compounds comprising a structure of the formula (I) or (Ia) or compounds of the formula (Ib) with an aqueous base fluid to make a treatment fluid; and placing the treatment fluid in a near wellbore region or propped fracture, thereby treating the formation sand matrix.

In various embodiments, the present invention provides a system comprising a treatment fluid compounds comprising a structure of the formula (I) or (Ia) or compounds of the formula (Ib) and a subterranean formation comprising the treatment fluid.

In various embodiments, systems configured for delivering the treatments of various embodiments of the present invention to a downhole location are described. In various embodiments, the systems can comprise a pump fluidly coupled to a tubular, the tubular containing the treatment fluids described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into a subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to a tubular. That is, in such embodiments, the low pressure pump may be configured to convey the fluid to the high pressure pump. In such embodiments, the low pressure pump may "step up" the pressure of the fluid before it reaches the high pressure pump.

In some embodiments, the systems described herein can further comprise a mixing tank that is upstream of the pump and in which the treatment fluids described herein are formulated. In various embodiments, the pump (e.g., a low pressure pump, a high pressure pump, or a combination thereof) may convey the fluid from the mixing tank or other source of the fluid to the tubular. In other embodiments, however, the treatment fluids described herein can be formulated offsite and transported to a worksite, in which case the fluid may be introduced to the tubular via the pump directly from its shipping container (e.g., a truck, a railcar, a barge, or the like) or from a transport pipeline. In either case, the fluid may be drawn into the pump, elevated to an appropriate pressure, and then introduced into the tubular for delivery downhole.

FIG. 1 shows an illustrative schematic of a system that can deliver treatment fluids of various embodiments described herein to a downhole location, according to one or more embodiments. It should be noted that while FIG. 1 generally depicts a land-based system, it is to be recognized that like systems may be operated in subsea locations as well. As depicted in FIG. 1, system 200 may include mixing tank 202, in which treatment fluids of the present invention may be formulated. The treatment fluids can be conveyed via line 204 to wellhead 206, where the treatment fluids enter tubular 208, tubular 208 extending from wellhead 206 into subterranean formation 210. Upon being ejected from tubular 208, the treatment fluids described herein can subsequently penetrate into subterranean formation 210. Pump 212 may be configured to raise the pressure of the fluid to a desired degree before its introduction into tubular 208. It is to be recognized that system 200 is merely provided as an example in nature and various additional components may be present that have not necessarily been depicted in FIG. 1, in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluids can, in some embodiments, flow back to wellhead 206 and exit subterranean formation 210. In some embodiments, the treatment fluid that has flowed back to wellhead 206 may subsequently be recovered and recirculated to subterranean formation 210.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

The present invention provides for the following embodiments, the numbering of which is not to be construed as designating levels of importance:

Embodiment 1 relates to a method comprising:

obtaining or providing a treatment fluid comprising:

a compound comprising a structure of the formula (I):

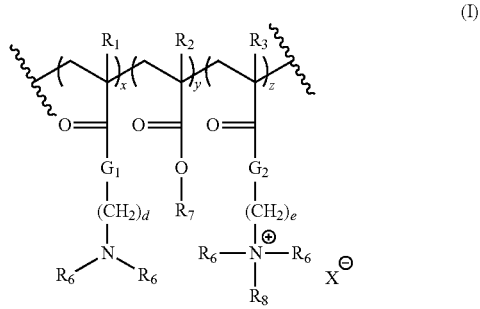

(I)

wherein each $X^-$ is a counterion;

each $R_1$, $R_2$, and $R_3$, are, independently, H or a $C_1$-$C_8$ alkyl group;

each $R_6$ is, independently, a hydrocarbyl group;

each $R_7$ is, independently, H or a hydrocarbyl group or one or more $R_7$ groups are absent such that the group —C(O)OR$_7$ is a —C(O)OM group, wherein M is a cationic counterion;

each $R_8$ is, independently, a hydrocarbyl group;

each $G_1$ is, independently, —O— or —NR$_4$—, wherein each $R_4$ is independently H or a hydrocarbyl group;

each $G_2$ is, independently, —O— or —NR$_4$—, wherein each $R_4$ is independently H or a hydrocarbyl group;

each d is, independently, an integer from 2 to 8;

each e is, independently, an integer from 2 to 8;

wherein the subscripts x, y, and z represent overall monomer mole fractions in the polymer, with random or block monomer distribution, such that z is between about 0.16 and about 0.5 and x+y is about 0.5 to about 0.84; and placing the treatment fluid in a subterranean formation.

Embodiment 2 relates to the method of Embodiment 1, wherein the treatment fluid further comprises proppant particles.

Embodiment 3 relates to the method of Embodiments 1-2, wherein each $R_6$ is, independently, a $C_1$-$C_8$ hydrocarbyl group.

Embodiment 4 relates to the method of Embodiment 3, wherein the $C_1$-$C_8$ hydrocarbyl group is a $C_1$-$C_8$ alkyl group.

Embodiment 5 relates to the method of Embodiments 1-4, wherein $R_7$ is absent such that the group —C(O)OR$_7$ is a —C(O)OM group, wherein M is a cationic counterion.

Embodiment 6 relates to the method of Embodiments 1-5, wherein each $R_8$ is, independently, a $C_8$-$C_{30}$ hydrocarbyl group or a $C_{12}$-$C_{20}$ hydrocarbyl group.

Embodiment 7 relates to the method of Embodiment 6, wherein the $C_8$-$C_{30}$ hydrocarbyl group or a $C_{12}$-$C_{20}$ hydrocarbyl group is a $C_8$-$C_{30}$ alkyl group or $C_{12}$-$C_{20}$ alkyl group, respectively.

Embodiment 8 relates to the method of Embodiments 1-7, wherein each $G_1$ or $G_2$ is, independently, —O—.

Embodiment 9 relates to the method of Embodiments 1-8, wherein the molar ratio of the sum of the moles of $CH_3$ groups along the backbone of the polymer to moles of groups —C(O)-G$_2$-(CH$_2$)$_e$—N(R$_6$)$_2$R$_8^+$ is 0.1:1 to 1:0.1.

Embodiment 10 relates to the method of Embodiments 1-9, wherein the counterion is selected from the group consisting of $^+N(R_{10})_4$, wherein each $R_{10}$ is, independently, H or a $C_1$-$C_8$ alkyl group; an alkali metal ion; and an alkaline earth metal ion.

Embodiment 11 relates to the method of Embodiments 1-10, wherein each $G_1$ and $G_2$ is —O—; $R_7$ is absent such that the group —C(O)OR$_7$ is a —C(O)OM group, wherein M is a cationic counterion; each d and e is 2; each $R_6$ is a methyl group; and each $R_8$ is a $C_{12}$-$C_{20}$ alkyl group.

Embodiment 12 relates to the method of Embodiments 1-11, wherein the treatment fluid comprises a stimulation fluid, clean-up fluid, fracturing fluid, spotting fluid, production fluid, completion fluid, remedial treatment fluid, acidizing fluid, a fluid control material, a packing fluid or combinations thereof.

Embodiment 13 relates to the method of Embodiments 1-12, wherein the treatment fluid simultaneously reduces the permeability of a subterranean formation to the flow of aqueous fluids through a portion of a subterranean formation and the migration of fines through a portion of a subterranean formation.

Embodiment 14 relates to a method comprising:

placing a treatment fluid comprising:

a compound comprising a structure of the formula (I):

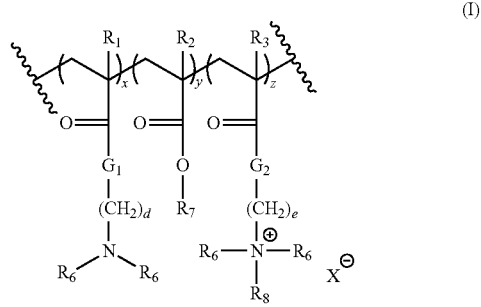

(I)

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR₇ is a —C(O)OM group, wherein M is a cationic counterion;
each $R_8$ is, independently, a hydrocarbyl group;
each $G_1$ is, independently, —O— or —NR₄—, wherein each $R_4$ is independently H or a hydrocarbyl group;
each $G_2$ is, independently, —O— or —NR₄—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
in a subterranean formation.

Embodiment 15 relates to a treatment fluid comprising:
a compound comprising a structure of the formula (I):

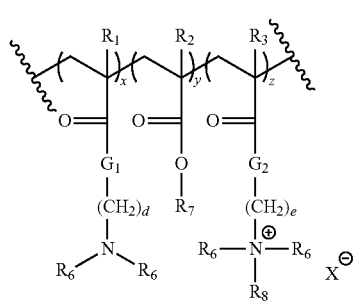

(I)

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR₇ is a —C(O)OM group, wherein M is a cationic counterion;
each $R_8$ is, independently, a hydrocarbyl group;
each $G_1$ is, independently, —O— or —NR₄—, wherein each $R_4$ is independently H or a hydrocarbyl group;
each $G_2$ is, independently, —O— or —NR₄—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84.

Embodiment 16 relates to the treatment fluid of Embodiment 15 further comprising proppant particles.

Embodiment 17 relates to a system comprising the treatment fluid of Embodiment 15 and a subterranean formation comprising the treatment fluid.

Embodiment 18 relates to the system of Embodiment 17, further comprising a tubular disposed in a wellbore and a pump configured to pump the treatment fluid into the subterranean formation.

Embodiment 19 relates to a plurality of proppant particles comprising a compound comprising a structure of the formula (I):

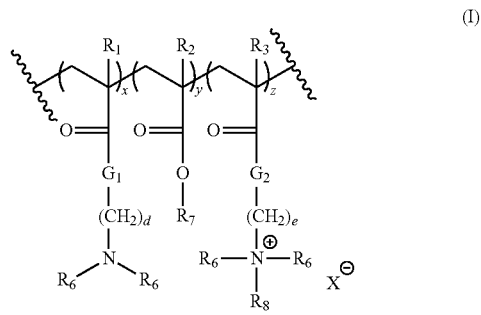

(I)

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)OR₇ is a —C(O)OM group, wherein M is a cationic counterion;
each $R_8$ is, independently, a hydrocarbyl group;
each $G_1$ is, independently, —O— or —NR₄—, wherein each $R_4$ is independently H or a hydrocarbyl group;
each $G_2$ is, independently, —O— or —NR₄—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84.

Embodiment 20 relates to the proppant particles of Embodiment 19, wherein the compound of the formula (I) is adsorbed thereon.

Embodiment 21 relates to the proppant particles of Embodiment 20, wherein the compound of the formula (I) substantially covers the proppant particles.

Embodiment 22 relates to the proppant particles of Embodiment 19, wherein the proppant particles are treated with the compound of the formula I in a dry state prior to the addition of treated proppant particles to the treatment fluid.

Embodiment 23 relates to a method comprising:
(i) metering a composition comprising a compound comprising a structure of the formula (I):

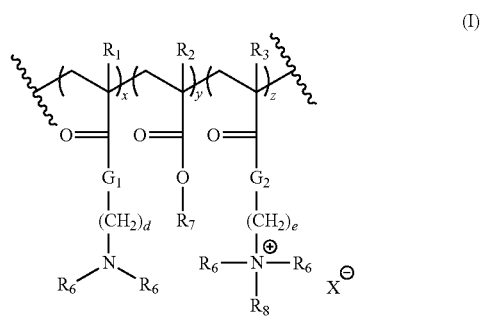

(I)

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
into an aqueous base fluid comprising a plurality of proppant particles, while the aqueous base fluid is being mixed, to make a proppant-containing mixture;
(ii) mixing the proppant-containing mixture for a time sufficient for the composition comprising a compound comprising a structure of the formula (I) to coat the proppant particles to make a proppant slurry in the aqueous base fluid; and
(iii) placing the proppant slurry in the aqueous base fluid in a subterranean formation as part of a hydraulic fracturing, frac-packing, or gravel treatment.

Embodiment 24 relates to a method comprising:
(i) dry-coating a plurality of proppant particles with a composition comprising a compound comprising a structure of the formula (I):

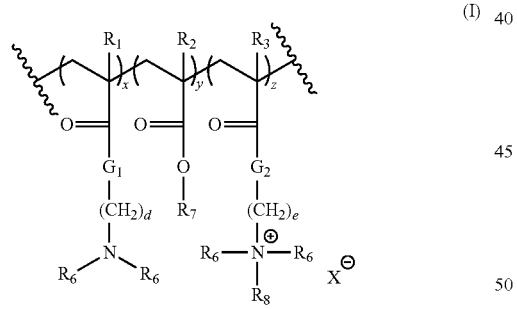

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
to make a plurality of dry-coated proppant particles;
(ii) mixing the plurality of dry-coated proppant particles with an aqueous base fluid to make a proppant slurry; and
(iii) placing the proppant slurry in the aqueous base fluid in a subterranean formation as part of a hydraulic fracturing, frac-packing or gravel treatment.

Embodiment 25 relates to a method of treating a subterranean formation sand matrix comprising:
(i) diluting a composition comprising a compound comprising a structure of the formula (I):

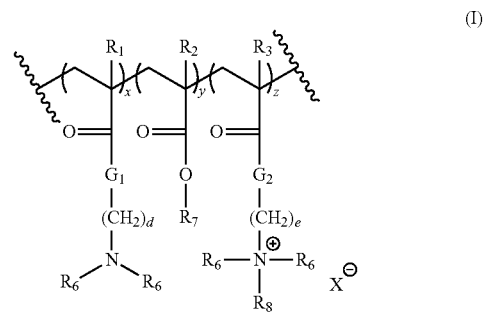

wherein each X⁻ is a counterion;
each $R_1$, $R_2$, and $R_3$, are, independently, H or a $C_1$-$C_8$ alkyl group;
each $R_6$ is, independently, a hydrocarbyl group;
each $R_7$ is, independently, H or a hydrocarbyl group or one or more $R_7$ groups are absent such that the group —C(O)O$R_7$ is a —C(O)OM group, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8;
wherein the subscripts x, y, and z represent overall monomer mole fractions in the polymer, with random or block monomer distribution, such that z is between about 0.16 and about 0.5 and x+y is about 0.5 to about 0.84;
with an aqueous base fluid to make a treatment fluid; and
(ii) placing the treatment fluid in a near wellbore region or propped fracture, thereby treating the formation sand matrix.

In any of the preceding embodiments, each $R_1$, $R_2$, and $R_3$ can be a $C_1$-$C_8$ alkyl group such as a methyl group.

What is claimed is:
1. A method comprising:
placing a treatment fluid in a subterranean formation, wherein the treatment fluid comprises a compound comprising a structure of the formula (I):

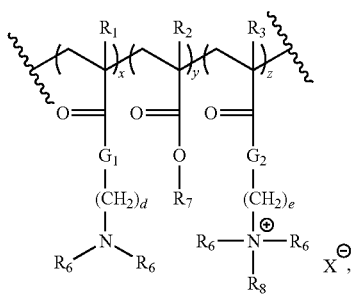

(I)

wherein each X⁻ is a counterion;
each $R_1$, $R_2$, and $R_3$, is, independently, H or a $C_1$-$C_8$ alkyl group;
each $R_6$ is, independently, a hydrocarbyl group;
$R_7$ is absent such that the group —C(O)O$R_7$ is a group —C(O)OM, wherein M is a cationic counterion;
each $R_8$ is, independently, a hydrocarbyl group;
each $G_1$ is, independently, —O— or —N$R_4$—, wherein each $R_4$ is independently H or a hydrocarbyl group;
each $G_2$ is, independently, —O— or —N$R_4$—, wherein each $R_4$ is independently H or a hydrocarbyl group;
each d is, independently, an integer from 2 to 8;
each e is, independently, an integer from 2 to 8; and
wherein the subscripts x, y, and z represent overall monomer mole fractions in the polymer, with random or block monomer distribution, such that z is between about 0.16 and about 0.5, x+y is about 0.5 to about 0.84, and x and y are non-zero.

2. The method of claim 1, wherein the treatment fluid further comprises proppant particles.

3. The method of claim 1, wherein $R_1$, $R_2$, and $R_3$ are each a $C_1$-$C_8$ alkyl group.

4. The method of claim 1, wherein each $R_6$ is, independently, a $C_1$-$C_8$ hydrocarbyl group.

5. The method of claim 1, wherein each $R_8$ is, independently, a $C_8$-$C_{30}$ hydrocarbyl group or a $C_{12}$-$C_{20}$ hydrocarbyl group.

6. The method of claim 1, wherein each $G_1$ or $G_2$ is, independently, —O—.

7. The method of claim 1, wherein the molar ratio of the sum of the moles of $CH_3$ groups along the backbone of the polymer to moles of groups —C(O)-$G_2$-$(CH_2)_e$—N$(R_6)_2R_8^+$ is 0.1:1 to 1:0.1.

8. The method of claim 1, wherein the cationic counterion is selected from the group consisting of $^+N(R_{10})_4$, wherein each $R_{10}$ is, independently, H or a $C_1$-$C_8$ alkyl group; an alkali metal ion; and an alkaline earth metal ion.

9. The method of claim 1, wherein each $G_1$ and $G_2$ is —O—; each d and e is 2; each $R_6$ is a methyl group; and each $R_8$ is a $C_{12}$-$C_{20}$ alkyl group.

10. The method of claim 1, wherein the treatment fluid comprises a stimulation fluid, clean-up fluid, fracturing fluid, spotting fluid, production fluid, completion fluid, remedial treatment fluid, acidizing fluid, a fluid control material, a packing fluid or combinations thereof.

11. The method of claim 1, wherein the treatment fluid simultaneously reduces the permeability of a subterranean formation to the flow of aqueous fluids through a portion of a subterranean formation and the migration of fines through a portion of a subterranean formation.

12. The method of claim 1, wherein the cationic counterion comprises an ammonium ion.

13. The method of claim 1, wherein the cationic counterion comprises an alkali metal ion.

14. The method of claim 1, wherein the cationic counterion comprises an alkaline earth metal ion.

* * * * *